(12) United States Patent
Tomita et al.

(10) Patent No.: US 6,517,973 B1
(45) Date of Patent: Feb. 11, 2003

(54) NON-AQUEOUS ELECTROLYTE BATTERY

(75) Inventors: Takashi Tomita, Miyagi (JP); Hideaki Ojima, Miyagi (JP); Kinichi Ishino, Miyagi (JP); Takayuki Kondo, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/532,795

(22) Filed: Mar. 22, 2000

(30) Foreign Application Priority Data

Mar. 25, 1999 (JP) .......................................... 11-082375

(51) Int. Cl.[7] .............................. H01M 4/58; H01M 6/00
(52) U.S. Cl. ............................... 429/231.4; 429/231.1; 429/231.8; 429/218; 429/218.1; 29/623.1; 29/623.2; 29/623.3; 29/623.4; 29/623.5
(58) Field of Search ........................... 429/231.4, 231.1, 429/231.8, 218, 218.1; 29/623.1–623.5

(56) References Cited

U.S. PATENT DOCUMENTS

| | | | | |
|---|---|---|---|---|
| 4,142,028 A | * | 2/1979 | Leger et al. ............. | 429/218.1 |
| 4,273,839 A | * | 6/1981 | Carr et al. ................. | 429/199 |
| 4,446,212 A | * | 5/1984 | Kaun ........................ | 429/103 |
| 5,478,364 A | * | 12/1995 | Mitate et al. .............. | 29/623.5 |
| 5,686,203 A | * | 11/1997 | Idota et al. ............... | 429/218.1 |
| 6,025,437 A | * | 2/2000 | Hirahara et al. .............. | 525/89 |
| 6,117,596 A | * | 9/2000 | Lee et al. ................... | 252/62.2 |
| 6,171,725 B1 | * | 1/2001 | Suzuki et al. ............. | 429/218.1 |

FOREIGN PATENT DOCUMENTS

| | | | | |
|---|---|---|---|---|
| EP | 0845825 A1 | | 6/1998 | |
| JP | 7111161 A | | 4/1995 | |
| JP | 10188957 A | | 7/1998 | |
| WO | WO 98/24135 | * | 6/1998 | ............. 429/218.1 |

* cited by examiner

Primary Examiner—Tom Dunn
Assistant Examiner—L. Edmondson
(74) Attorney, Agent, or Firm—Sonnenschein, Nath & Rosenthal

(57) ABSTRACT

A non-aqueous electrolyte battery having improved low temperature characteristics and preservation characteristics. The non-aqueous electrolyte battery includes a negative electrode containing a carbon material as a negative electrode active material, a positive electrode containing a positive electrode active material and which is arranged facing the negative electrode and a non-aqueous electrolyte arranged between the negative and positive electrodes. The negative electrode contains a material not doped with lithium and/or not emitting lithium in an amount of not less than 20 wt % and not larger than 40 wt % based on the negative electrode active material.

7 Claims, 1 Drawing Sheet

NON-AQUEOUS ELECTROLYTE BATTERY

RELATED APPLICATION DATA

The present application claims priority to Japanese Application No. P11-082375 filed Mar. 25, 1999 which application is incorporated herein by reference to the extent permitted by law.

BACKGROUND OF THE INVENTION

1. Field of the Invention

This invention relates to a non-aqueous electrolyte battery and, more particularly, to a non-aqueous electrolyte battery having improved low-temperature characteristics and preservation performance.

2. Description of Prior Art

Recently, a wide variety of portable electronic equipment, such as a camera built-in video tape recorder, portable telephone or a lap-top computer, have made their debut, and attempts are being made to reduce their ize and weight. As portable power sources ofthese electronic equipments, researches and development for improving the energy density of the batteries, in particular the secondary batteries, are going on briskly.

The batteries employing the non-aqueous electrolyte, in particular the lithium ion secondary batteries, are able to develop a higher energy density than is possible with a conventional secondary battery employing an aqueous electrolytic solution, such as a lead battery or a nickel cadmium battery. For this reason, the prospect for the lithium ion secondary batteries is favorable and the market therefor is increasing rapidly. With the expansion of the market, the operating conditions for the batteries are becoming diversified. In particular, the demand for using the batteries under low temperature is increasing rapidly. Also, as the operating conditions for the portable electronic equipment are diversified, there is raised an increasing demand for the preservation capability of the batteries.

However, up to now, the low-temperature characteristics for the non-aqueous electrolyte secondary batteries are not sufficient, whilst the preservation characteristics thereof leave much to be desired. For this reason, there is raised a strong demand for a technique for possibly improving these characteristics.

SUMMARY OF THE INVENTION

It is therefore an object of the present invention to provide a non-aqueous electrolyte secondary battery having improved low temperature and preservation characteristics.

In one aspect, the present invention provides a non-aqueous electrolyte battery including a negative electrode containing a carbon material as a negative electrode active material, a positive electrode arranged facing the negative electrode and which has the negative electrode containing a positive electrode active material, and a non-aqueous electrolyte interposed between the negative and positive electrodes. The negative electrode contains a material not doped with or releasing lithium in an amount not less than 20 wt % and not larger than 40 wt % based on the negative electrode active material.

According to the present invention, in which a compound not doped with nor emitting lithium is contained in the negative electrode active material, there is provided a non-aqueous electrolyte battery in which the temperature of the negative electrode active material is not lowered thanks to the temperature keeping effect of the compound, even if the environment of the battery is at a lower temperature, thus keeping an optimum battery performance.

DESCRIPTION OF THE PREFERRED EMBODIMENTS

Figure 1:
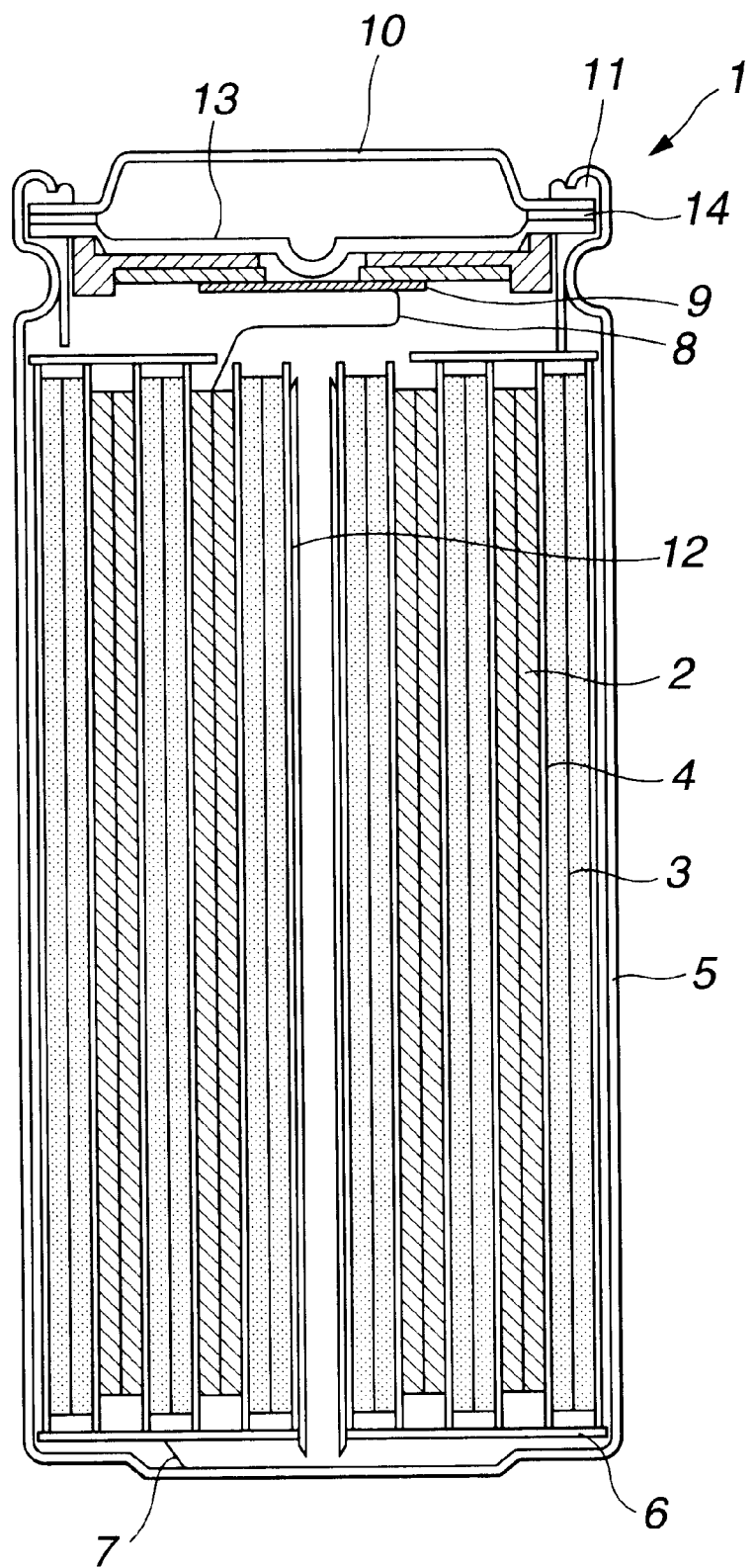
FIG. 1 is a cross-sectional view showing an illustrative structure of a non-aqueous electrolyte secondary battery according to the present invention.

Referring to the drawings, preferred embodiments of according to the present invention will be explained in detail.

FIG. 1 shows a longitudinal cross-sectional view showing an illustrative structure of a non-aqueous electrolyte battery 1 according to the present invention. This non-aqueous electrolyte battery 1 includes a film-like positive electrode 2 and a film-like negative electrode 3, tightly wound together into an electrode coil, via a separator 4 in-between, and a battery can 5 accommodating the electrode coil.

The positive electrode 2 is prepared by coating a positive electrode mixture, composed of an positive electrode active material and a binder, on a positive electrode collector, and drying the resulting product. As the positive electrode collector, a metal foil, such as an aluminum foil, is used.

As the positive electrode active material, metal oxides, metal sulfides or specified high molecular materials may be used depending on the type of the battery to be prepared. If, for example, a lithium secondary battery is to be produced, metal sulfides or oxides, such as $TiS_2$, $MoS_2$, $NbSe_2$ or $V_2O_5$, may be used.

As the positive electrode active material, lithium compound oxides, mainly composed of $LiMxO_2$, where M is one or more transition metal and x is usually not less than 0.05 and not larger than 1.10, depending on the battery charging/discharging state. As the transition metal M of the lithium compound oxides, Co, Ni or Mn is preferred. Specified examples of these lithium compound oxides include $Li_xCoO_2$, $Li_xNiO_2$, $Li_xNi_yCo_{1-y}O_2$ and $Li_xMn_2O_4$, where x=1 and 0<y<1.

The above-described lithium compound oxides can produce a high voltage and prove a positive electrode active material having a superior energy density. For the positive electrode 2, plural species of the positive electrode active materials may be used in combination.

As the binder of the positive electrode mixture, any suitable known binder, routinely used as the positive electrode mixture for this sort of the battery, may be used. Also, any suitable known additive, such as an electrifying agent, may also be mixed to the positive electrode mixture.

The negative electrode 3 may be prepared by coating a negative electrode mixture composed of a negative electrode active material and a binder on a negative electrode collector. As the negative electrode collector, a metal foil, such as a copper foil, may be used.

When constituting a lithium battery, lithium, lithium alloys or such a material that can be doped with lithium and/or which can emit lithium is preferably used. As a material that can be doped with lithium and/or which can emit lithium, carbon-based materials, such as a carbonaceous material difficult to graphize, or a graphite-based material, may be used.

As the negative electrode active material, carbon-based materials, such as pyrocarbons, cokes, graphites, vitreous carbon fibers, sintered organic high molecular compounds, carbon fibers or activated charcoal, may be used. The cokes may be exemplified by pitch coke, needle coke or petroleum coke. The sintered organic high molecular compounds mean phenolic or furane resins carbonized by firing at a suitable temperature.

As the binder of the negative electrode mixture, any suitable binder routinely used for this sort of the battery may be used. In addition, the binder may be admixed with any suitable known additives.

In the non-aqueous electrolyte battery of the present invention, there is contained a compound not doped with lithium and/or not emitting lithium in the negative electrode mixture. By the negative electrode mixture containing a compound not doped with lithium or not emitting lithium, the battery performance at lower temperatures can be improved. The reason is that the compound absorbs the Joule's heat, evolved on current conduction, to temporarily reduce heat dissipation to outside the battery, so that, at lower temperatures, the temperature of the negative electrode active material can be temporarily maintained at a substantially higher temperature than the ambient temperature.

Whether a given compound is not doped with lithium and/or does not emit lithium can be checked by the following experiment:

85 parts by weight of the compound, 10 parts by weight of KS6, manufactured by RONSA INC., as graphite, and 5 parts by weight of polyvinylidene fluoride, were mixed together. 60 mg of the resulting mixture was compression-molded to a disk 16 mm in diameter and dried in vacuum at 120° C. for 12 hours. Using an electrolytic solution, obtained on dissolving $LiPF_6$, at a rate of 1 mol/%, in a mixed solvent composed of equal amounts of ethylene carbonate and diethyl carbonate, a 2016 type coin cell was prepared, with lithium as the negative electrode and with the molded product containing the above compound as the positive electrode. This battery was discharged at a constant current at 0.5 mA to 0.05V to find the lithium doping capacity (mAH) as A.

Similarly, a cell was prepared, using 60 mg of a mixed molded product of 95 parts by weight of KS6 and 5 parts by weight of polyvinylidene fluoride, as a positive electrode. This battery was discharged at constant current at 0.5 mA to 0.05 V to find the lithium doping capacity (iAH) as B.

Then, a value calculated from A−(B×10/95) is retained to be the lithium doping capacity of the compound. If this value is not larger than 0.5 mA, the compound is retained to be not doped with lithium.

On the other hand, a battery similarly prepared using a mixed molded product of 85 parts by weight of the compound, 10 parts by weight of KS6 manufactured by RONSA INC. as graphite and 5 parts by weight of polyvinylidene fluoride, as a positive electrode, was discharged at a constant current and charged at a constant current to 4.5 V to find the lithium emitting capacity (mAH) as A'.

Also, a battery prepared similarly using a mixed molded product of 95 parts by weight of KS6 and 5 parts by weight of polyvinylidene fluoride was discharged at constant current at 0.5 mA to 0.05V and discharged at constant current to 4.5 V to find the lithium emission capacity (mAH) as B'.

Then, a value calculated by A'−(B'×10/95) is retained to be the lithium emitting capacity of the compound. If this value is not larger than 0.5 mAh, the compound is retained not to emit lithium.

The compound not doped with lithium and/or which does not emit lithium may be exemplified by oxides containing Al, Si, Zr, Mg, Ca, Sr or rare earth elements. As oxides not doped with lithium and/or not emitting lithium may be exemplified by, for example, $Al_2O_3$, $SiO_2$, $ZrO_2$, $Al_2SiO_5$ and $Ca_2SiO_4$.

Among the above-described oxides, the total content of Al, Si and Zr to total cations in the oxide is preferably not less than 10 atm % and not larger than 100 atm %. These oxides may be exemplified by $Al_2O_3$, $SiO_2$ and $ZrO_2$.

Although not specified, the particle size of these oxides is preferably not less than 0.1 $\mu$m and not larger than 50 $\mu$m and more preferably not less than 0.2 $\mu$m and not larger than 20 $\mu$m.

The compound not doped with and/or not emitting lithium is contained in an amount not less than 20 wt % and not larger than 40 wt % based on the amount of the negative electrode active material. If the compound not doped with and/or not emitting lithium is contained in an amount less than 20 wt %, the temperature keeping effect of the negative electrode active material by the compound absorbing the Joule's heat is insufficient. If the compound not doped with and/or not emitting lithium is contained in an amount larger than 40 wt %, the energy density of the negative electrode active material is lowered to lower the capacity of the non-aqueous electrolyte battery 1. If the compound not doped with and/or not emitting lithium is contained in an amount not less than 20 wt % and not larger than 40 wt %, it is possible to improve the temperature keeping characteristics of the non-aqueous electrolyte battery 1 by the temperature keeping effect of the negative electrode active material.

The compound not doped with and/or not emitting lithium is preferably contained in an amount not less than 20 wt % and not larger than 30 wt % based on the amount of the negative electrode active material. By the compound not doped with and/or not emitting lithium being contained in the above range, the temperature keeping effect of the negative electrode active material can be increased firther to improve the temperature keeping effect of the non-aqueous electrolyte battery 1 more significantly.

The non-aqueous electrolyte solution is prepared by dissolving the electrolyte in a non-aqueous solvent.

As the electrolyte, any suitable known electrolyte routinely used for this sort of the battery may be used. Specified examples include lithium salts such as $LiPF_6$, $LiBF_4$, $LiAsF_6$, $LiClO_4$, $LiCF_3SO_3$, $LiN(SO_2CF_3)_2$, $LiC(SO_2CF_3)_3$, $LiAlCl_4$ or $LiSiF_6$. Of these, $LiPF_6$ and $LiBF_4$ are preferred in view of oxidation stability.

The electrolyte is contained in an amount preferably of 0.1 mol/l to 5.0 mol/l and more preferably of 0.5 mol/l to 3.0 mol/l.

As the non-aqueous solvent, any suitable non-aqueous solvents routinely used in the non-aqueous electrolytic solution may be used. For example, cyclic carbonic acid esters, such as propylene carbonate or ethylene carbonate, chain carbonic acid esters, such as diethyl carbonate or dimethyl carbonate, carbonic acid esters, such as methyl propionate or methyl lactate, or ethers, such as γ-butyrolactone, sulforan, 2-methyl tetrahydrofuran or dimethoxy ethane. These non-aqueous solvents may be used singly or in combination. In particular, carbonic acid esters are preferred in view of oxidation stability.

The non-aqueous electrolyte battery 1 is prepared as follows:

The positive electrode 2 is prepared by forming a layer of the positive electrode active material by uniformly coating a positive electrode mixture containing the positive electrode active material and the binder on a metal foil, such as a positive electrode collector, operating as a positive electrode collector, and drying the resulting product in situ to form a layer of a positive electrode active material. As the binder for the positive electrode mixture, any suitable known binder may be used. In addition, any suitable known additives may be added to the negative electrode mixture.

In the non-aqueous electrolyte battery according to the present invention, a material not doped with and/or not emitting lithium is contained in the negative electrode mixture. By the negative electrode mixture containing the material not doped with and/or not emitting lithium, battery characteristics at room temperature can be improved. Examples of the compound not doped with and/or not emitting lithium include $Al_2O_3$, $SiO_2$, $ZrO_2$, $Al_2SiO_5$ and $Ca_2SiO_4$. Of these, $Al_2O_3$, $SiO_2$ and $ZrO_2$ are preferably used.

The positive electrode 2 and the negative electrode 3 are stacked tightly and coiled helically a number of times, with the separator 4 comprised of a porous polypropylene film in-between, to form an electrode coil.

An insulating plate 6 then is inserted on a bottom plate of the nickel plated iron battery can 5 and the electrode coil is housed therein. For collecting the current from the negative electrode, one end of the negative electrode lead 7 of e.g., nickel is pressured against the negative electrode 3, whilst the other end thereof is welded to the battery can 5. This battery can is electrically connected to the negative electrode 3 and thus proves an external negative electrode of the non-aqueous electrolyte battery 1. For collecting the current from the positive electrode 2, one end of the positive electrode lead 8, formed of aluminum, is mounted on the positive electrode 2, with the other end thereof being electrically connected to a battery cap 10 through a current interrupting thin plate 9. This current interrupting thin plate 9 interrupts the current responsive to an internal pressure in the battery. This electrically connects the battery cap 10 with the positive electrode 2 so that the battery cap 10 proves an external positive electrode 2 of the non-aqueous electrolyte battery 1.

Then, a non-aqueous electrolyte is injected into the interior of the battery can 5. The non-aqueous electrolyte is prepared by dissolving the electrolyte in the non-aqueous solvent.

The battery can 5 then is caulked using an insulating sealing gasket 11 coated with asphalt to secure the battery cap 10 to complete a cylindrical non-aqueous electrolyte battery 1.

Meanwhile, the non-aqueous electrolyte battery 1 is provided with a center pin 12 for connecting to a negative terminal lead 7 and to a positive electrode lead 8. The non-aqueous electrolyte battery 1 is also provided with a safety valve device 13 for degassing the interior of the battery 1 if the pressure in the battery is higher than a predetermined value, and a PTC element 14 for prohibiting temperature rise within the battery.

Although the above-described embodiment is directed to a secondary battery, the present invention can also be applied to a primary battery besides the secondary battery. There is also no limitation as to the shape of the battery and may be applied to e.g., a cylindrical, square-shaped, coin-shaped or button-shaped batteries. The battery of the present invention may also be of variable sizes, such that it may be thin-shaped or of large size.

The above-described embodiment is directed to using a non-aqueous electrolyte solution comprised of an electrolyte dissolved in a non-aqueous solvent. The present invention can, however, be applied to applied to a battery employing a solid electrolyte having the electrolyte diffused in a high polymer matrix or a gel-like solid electrolyte containing a swollen solvent.

EXAMPLES

The non-aqueous electrolyte battery, such as is described above, was prepared and its characteristics were evaluated.

A negative electrode was first prepared as follows:

First, petroleum pitch, used as a starting material, was fired at 1000° C. in an inert gas stream to a carbon material which is difficult to graphize and which has properties similar to those of vitreous carbon. X-ray diffractometry was effected on this carbon material difficult to graphize. It was found that the spacing of the (002) plane was 3.76 Å and the true specific gravity was 1.58 g/cm3.

The produced carbon material, difficult to graphize, was crushed to particles of the carbon material having a mean particle size of 10 $\mu$m. 100 parts by weight of the particles of the carbon material, 11 parts by weight of the binder and 20 parts by weight of $\alpha$-$Al_2O_3$ were mixed together to formulate a negative electrode mixture. As the binder, polyvinylidene fluoride (PVDF) was used.

The negative electrode mixture was dispersed in N-methyl-2-pyrrolidone to a slurry, which then was evenly coated on both surfaces of a strip of a copper foil 10 $\mu$m in thickness and dried in situ to form a layer of a negative electrode active material. The resulting product was compression molded in a roll press to produce a negative electrode.

A positive electrode then was prepared as follows:

First, lithiwn carbonate and cobalt carbonate were mixed at a molar ratio of 0.5 mol to 1 mol and fired in air at 900° C. for five hours to $LiCoO_2$ as a positive electrode active material.

91 parts by weight of the produced $LiCoO_2$, 6 parts by weight of an electrifying agent and 3 parts by weight of the binder were mixed together to a positive electrode mixture. The electrifying agent used was graphite, while the binder used was polyvinylidene fluoride.

The positive electrode mixture was dispersed in N-methyl-2-pyrrolidone to a slurry, which then was evenly coated on both surfaces of a strip of an aluminum foil 20 $\mu$m in thickness and was dried in situ to form a layer of a positive electrode active material. The resulting product was compression molded in a roll press to produce a positive electrode.

The positive electrode and the negative electrode, produced as described above, were stacked tightly and coiled helically a number of times, with the separator comprised of a porous polypropylene film 25 $\mu$m in thickness in-between, to form an electrode coil.

An insulating plate then was inserted on a bottom of the nickel plated iron battery can and the electrode coil was housed therein. For collecting the current from the negative electrode, one end of the negative electrode lead of e.g., nickel is pressure-bonded against the negative electrode 3, whilst the other end thereof was welded to the battery can 5. For collecting the current from the positive electrode, one end of the positive electrode lead, formed of aluminum, was mounted on the positive electrode, with the other end thereof being electrically connected to a battery cap through a current interrupting thin plate. This current interrupting thin plate interrupts the current responsive to an internal pressure in the battery.

Into this battery can was injected a non-aqueous electrolyte solution. This non-aqueous electrolyte solution was previously prepared by dissolving an electrolyte $LiPF_6$ in a mixed solvent of 50 vol % of propylene carbonate and 50 vol % of dimethyl carbonate at a concentration of 1.0 mol/l.

The battery cap was secured by caulking a battery can through an insulating sealing gasket coated with asphalt to prepare a cylindrically-shaped non-aqueous electrolyte battery approximately 18 mm in diameter and approximately 65 mm in height.

Examples 2 to 12 and Comparative Examples 1 to 4

Plural samples of non-aqueous electrolyte batteries were prepared in the same way as in Example 1 except using a composition of the negative electrode mixture as shown in Table 1. It is noted that the amount of carbon per unit electrode area of each battery of Examples 2 to 14 and Comparative Example 1 to 3 was set so as to be equal to that of Example 1.

Example 13

A non-aqueous electrolyte battery was prepared in the same way as in Example 2 except that a mixed solvent of 50 vol % of ethylene carbonate and 50 vol % of diethyl carbonate was used as a solvent of the non-aqueous electrolyte solution and that graphite (KS-75 manufactured by RONZA INC., with spacing of the (002) plane of 0.3358 nm) was used as a material for the negative electrode in place of the difficult-to-graphize carbon material.

Comparative Example 5

A non-aqueous electrolyte battery was prepared in the same way as in Comparative Example 1 except that a mixed solvent of 50 vol % of ethylene carbonate and 50 vol % of diethyl carbonate was used as a solvent of the non-aqueous electrolyte solution and that graphite (KS-75 manufactured by RONZA INC., with spacing of the (002) plane of 0.3358 nm) was used as a material for the negative electrode in place of the difficult-to-graphize carbon material.

Table 1 shows the composition of a negative electrode mixture of the non-aqueous electrolyte batteries prepared in Examples 1 to 13 and in Comparative Examples 5.

TABLE 1

| | |
|---|---|
| Ex.1 | carbon:PVDF:$Al_2O_3$ (particle size, 0.7 μm) = 100:11:20 |
| Ex.2 | carbon:PVDF:$Al_2O_3$ (particle size, 0.7 μm) = 100:11:25 |
| Ex.3 | carbon:PVDF:$Al_2O_3$ (particle size, 0.7 μm) = 100:11:30 |
| Ex.4 | carbon:PVDF:$Al_2O_3$ (particle size, 0.7 μm) = 100:11:40 |
| Ex.5 | carbon:PVDF:$SiO_2$ (particle size, 2.5 μm) = 100:11:25 |
| Ex.6 | carbon:PVDF:$ZrO_2$ (particle size, 1.3 μm) = 100:11:25 |
| Ex.7 | carbon:PVDF:CaO (particle size, 2.5 μm) = 100:11:25 |
| Ex.8 | carbon:PVDF:MgO (particle size, 5.1 μm) = 100:11:25 |
| Ex.9 | carbon:PVDF:$Y_2O_3$ (particle size, 3 μm) = 100:11:25 |
| Ex. 10 | carbon:PVDF:$Ce_2O_3$ (particle size, 2.5 μm) = 100:11:25 |
| Ex. 11 | carbon:PVDF:$Ca_2SiO_4$ (particle size, 3.1 μm) = 100:11:25 |
| Ex. 12 | carbon:PVDF:$Al_2SiO_5$ (particle size, 3 μm) = 100:11:25 |
| Ex. 13 | KS75: PVDF: $Al_2O_3$ (particle size, 0.7 μm) = 100:11:25 |
| Comp. Ex. 1 | Carbon:PVDF = 100:11 |
| Comp. Ex. 2 | carbon:PVDF:$Al_2O_3$ (particle size, 0.7 μm) = 100:11:15 |
| Comp. Ex. 3 | carbon:PVDF:ZnO (particle size, 3.1 μm) = 100:11:25 |
| Comp. Ex. 4 | carbon:PVDF:$Al_2O_3$ (particle size, 0.7 μm) = 100:11:50 |
| Comp. Ex. 5 | KS75: PVDF = 100:11 |

Of the batteries of Examples 1 to 13 and the Comparative Example 1 to 5, prepared as described above, capacity characteristics, low-temperature characteristics and preservation characteristics were evaluated as follows:

As for the capacity characteristics, constant current constant voltage charging was performed for each battery sample at 23° C. and 1A for three hours up to an upper limit of 4.2 V. Then, constant current discharging at 700 mA was carried out up to the terminal voltage of 2.5V to determine the initial discharging capacity.

As for the preservation characteristics, constant current constant voltage charging was performed for each battery sample at 23° C. and 1A for three hours up to an upper limit of 4.2 V. Each battery sample was then preserved at 60° C. for four weeks. Then, constant current discharging at 700 mA was carried out at 23° C. up to the terminal voltage of2.5V. Then, charging/discharging was carried out at 23° C. once under the above condition to find the preservation capacity and the preservation capacity keeping ratio (%) for the initial capacity of 100 .

As for the preservation characteristics, constant current constant voltage charging was performed at 23° C. and 1A for three hours up to an upper limit of 4.2 V for each battery sample. Each battery sample was then allowed to stand at –20° C. for two hours. Then, constant current discharging at 700 mA was carried out up to the terminal voltage of 2.5V to find the low temperature capacity keeping ratio (%), with the discharging capacity at 23° C. being set to 100 .

Table 2 shows the results of the measurements of the capacity characteristics, low-temperature characteristics and preservation characteristics of the batteries of Examples 1 to 13 and the Comparative Examples 1 to 5.

| | initial capacity (mAh) | preservation capacity keeping ratio (%) | low temperature capacity keeping ratio (%) |
|---|---|---|---|
| Ex. 1 | 1420 | 83 | 35 |
| Ex. 2 | 1410 | 79 | 37 |
| Ex. 3 | 1400 | 83 | 37 |
| Ex. 4 | 1400 | 83 | 38 |
| Ex. 5 | 1400 | 84 | 35 |
| Ex. 6 | 1410 | 83 | 38 |
| Ex. 7 | 1390 | 80 | 32 |
| Ex. 8 | 1395 | 80 | 32 |
| Ex. 9 | 1390 | 79 | 33 |
| Ex. 10 | 1395 | 79 | 33 |
| Ex. 11 | 1410 | 81 | 34 |
| Ex. 12 | 1400 | 80 | 34 |
| Ex. 13 | 1400 | 84 | 40 |
| Comp. Ex. 1 | 1450 | 75 | 25 |
| Comp. Ex. 2 | 1445 | 75 | 28 |
| Comp. Ex. 3 | 1170 | 55 | 20 |
| Comp. Ex. 4 | 1300 | 75 | 31 |
| Comp. Ex. 5 | 1450 | 78 | 26 |

As may be seen from Table 2, in the batteries of Examples 1 to 13, obtained on adding a compound not doped with and/or not releasing lithium in an amount not less than 20 wt % and not larger than 40 wt % in a layer of a negative electrode active material, superior results were obtained as to the initial capacity and discharging capacity keeping ratio. The preservation characteristics of these batteries were also unobjectionable.

Conversely, in the Comparative Examples 1 and 4, obtained by not adding a compound not doped with and/or not releasing lithium, it is seen that, although the initial capacity is high, the discharging capacity keeping ratio, in particular the capacity keeping ratio at lower temperatures, is high.

In the battery of the Comparative Example 3, added to with an oxide known to be doped with and/or to release lithium, that is to react with lithium, it has been found that the initial capacity is low, with the capacity decrease being high.

In the Comparative Examples 2 and 4, in which a compound not doped with or releasing lithium in an amount less than 20 wt % or in an amount exceeding 40 wt %, it has not been possible to suppress the capacity decrease sufficiently.

It has thus been found that, by having a compound not doped with and/or not releasing lithium contained in a layer of the negative electrode active material in an amount not less than 20 wt % or exceeding 40 wt %, excellent capacity characteristics and excellent preservation characteristics are achieved, whilst low temperature characteristics in particular are appreciably improved.

As may be seen from comparison with Example 13 and Comparative Example 5, similar favorable results are obtained if the negative electrode material is a graphite-based material.

What is claimed is:

1. A non-aqueous electrolyte battery comprising:
   a negative electrode containing a carbon material as a negative electron active material;
   a positive electrode arranged facing said negative electrode, said negative electrode containing a positive electrode active material; and
   a non-aqueous electrolyte interposed between said negative and positive electrodes;
   wherein
   said negative electrode contains an oxide containing at least one element selected from the group consisting of Al, Zr, Mg, Ca, Sr and rare earth elements not doped with and/or not releasing lithium, said oxide present in an amount not less than 20 wt % and not larger than 40 wt % based on said negative electrode active material.

2. The non-aqueous electrolyte battery according to claim 1 wherein
   the total content in said oxide of Al and Zr with respect to total cations ranges between not less than 10 atm % and not more than 100 atm % based on the negative electrode active material.

3. The non-aqueous electrolyte battery according to claim 1 wherein said oxide is $Al_2O_3$ or $ZrO_2$ and wherein the proportion of the oxide with respect to the negative electrode active material is not less than 20 wt % and not more than 30 wt %.

4. The non-aqueous electrolyte battery according to claim 1 wherein
   said positive electrode contains a complex oxide of lithium and a transition metal as a positive electrode active material.

5. The non-aqueous electrolyte battery according to claim 1 wherein
   said electrolyte is at least one selected from the group consisting of $LiPF_6$, $LiBF_4$, $LiAsF_6$, $LiClO_4$, $LiCF_3SO_3$, $LiN(SO_2CF_3)_2$, $LiC(SO_2CF_3)_3$, $LiAlCl_4$ and $LiSiF_6$.

6. The non-aqueous electrolyte battery according to claim 5 wherein
   the concentration of the electrolyte in a non-aqueous solvent in which said electrolyte is soluble ranges between 0.1 mol/l and 5.0 mol/l.

7. The non-aqueous electrolyte battery according to claim 6 wherein
   said non-aqueous solvent is at least one selected from the group consisting of cyclic carbonic acid ester, a chain carbonic acid ester, carboxylic acid ester and an ether.

* * * * *